United States Patent [19]

Fukasawa et al.

[11] Patent Number: 5,442,662
[45] Date of Patent: Aug. 15, 1995

[54] CODE-DIVISION MULTIPLE-ACCESS COMMUNICATION SYSTEM PROVIDING ENHANCED CAPACITY WITHIN LIMITED BANDWIDTH

[75] Inventors: Atsushi Fukasawa; Manabu Kawabe; Akiyoshi Kawahashi; Takuro Sato, all of Tokyo, Japan

[73] Assignee: Oki Electric Industry Co., Ltd., Tokyo, Japan

[21] Appl. No.: 261,915

[22] Filed: Jun. 16, 1994

[30] Foreign Application Priority Data

Jul. 5, 1993 [JP] Japan .................................. 5-165632

[51] Int. Cl.$^6$ ....................... H04J 13/02; H04J 13/04; H04B 1/707
[52] U.S. Cl. ..................................... 375/205; 375/206; 380/34; 370/18; 370/19; 370/21; 370/22
[58] Field of Search ................. 375/1; 380/34; 370/18, 370/19, 21, 22

[56] References Cited

U.S. PATENT DOCUMENTS

| | | | |
|---|---|---|---|
| 3,124,748 | 3/1964 | Webb, Jr. .......................... | 380/34 X |
| 4,759,034 | 7/1988 | Nagazumi .................................. | 375/1 |
| 5,103,459 | 4/1992 | Gilhousen et al. ...................... | 375/1 |
| 5,166,951 | 11/1992 | Schilling .................................. | 375/1 |
| 5,309,474 | 5/1994 | Gilhousen et al. ...................... | 375/1 |
| 5,319,672 | 6/1994 | Sumiya et al. ........................... | 375/1 |

FOREIGN PATENT DOCUMENTS

| | | | |
|---|---|---|---|
| 360476 | 3/1990 | European Pat. Off. ........ | H04K 3/00 |
| 9200639 | 1/1992 | WIPO ............................ | H04L 27/30 |

OTHER PUBLICATIONS

Sklar, B, Digital Communications, Prentice Hall, 1988, pp. 571–573.

*Primary Examiner*—Bernarr E. Gregory
*Attorney, Agent, or Firm*—Steven M. Rabin; Allen Wood

[57] ABSTRACT

A code-division multiple-access spread-spectrum communication system uses pairs of spreading codes with rates of N/2 chips per data symbol to provide a capacity equivalent to that obtained in a conventional system with N chips per symbol. In the transmitter, identical input data are spread in parallel by both spreading codes, then used to modulate two orthogonal carrier signals, and the resulting radio-frequency signals are combined for transmission from an antenna. In the receiver, the received signal is demodulated by parallel multiplication with the two carrier signals, the resulting baseband signals are correlated with the two spreading codes, and the results are added.

25 Claims, 2 Drawing Sheets

CODE-DIVISION MULTIPLE-ACCESS COMMUNICATION SYSTEM PROVIDING ENHANCED CAPACITY WITHIN LIMITED BANDWIDTH

BACKGROUND OF THE INVENTION

This invention relates to code-division multiple-access (hereinafter, CDMA) spread-spectrum communications, and more particularly to a method and apparatus for increasing the number of users who can transmit simultaneously without increasing tile bandwidth requirement.

CDMA is a digital communication system that allows multiple users to communicate in the same frequency band. Briefly, each user's data is modulated by a different spreading code having a rate of N chips per data symbol (N being an integer greater than one), and all user's data are transmitted on the same carrier frequency. A receiver can recover a particular user's transmitted data by demodulating the received signal with that user's spreading code.

If the spreading codes are all mutually orthogonal over each symbol duration, then the demodulated signals will be free of interference. The number of mutually orthogonal spreading codes available depends on the chip rate N: the higher the value of N, the more orthogonal codes there are. If the spreading codes are only approximately orthogonal, then the number of different codes that can be used before interference causes an unacceptably high error rate depends similarly on N. In either case, higher values of N allow more users to transmit simultaneously; that is, higher values of N provide more user channels.

Accordingly, a simple way to accommodate more users in a CDMA system is to increase the chip rate. Unfortunately, this also increases the bandwidth of the transmitted CDMA signal. Operators of CDMA systems that have a fixed bandwidth allocation, such as digital cellular telephone systems, face tile dilemma of needing to increase their user capacity without being able to increase their bandwidth.

SUMMARY OF THE INVENTION

It is accordingly an object of the present invention to increase the user capacity of a CDMA communication system without requiring extra bandwidth.

The invention provides a method of transmitting and receiving symbol data in a CDMA spread-spectrum communication system, and a transmitter and receiver employing this method. The method comprises the steps of:

spreading identical input symbol data by two spreading codes to generate two baseband transmit signals;

generating two mutually orthogonal carrier signals;

modulating these two carrier signals by the two baseband transmit signals to generate two radio-frequency signals;

combining the two radio-frequency signals into a single radio-frequency signal, and transmitting this signal from a transmitting antenna to a receiving antenna;

demodulating the signal received at the receiving antenna to obtain two baseband receive signals;

despreading the two baseband receive signals by correlating them with the above two spreading codes to obtain two correlated signals; and summing the two correlated signals to obtain an output data signal.

DETAILED DESCRIPTION OF THE INVENTION

An embodiment of the invention will now be described in greater detail with reference to the attached, purely illustrative drawings. The embodiment comprises a transmitter, shown in FIG. 1, and a receiver, shown in FIG. 2. These can be fabricated as specialized integrated circuits, or they can be built from standard electronic circuits and components. Descriptions of specific circuit implementations will be omitted to avoid obscuring the invention with irrelevant detail. The scope of the invention should be determined not from the drawings but from the appended claims.

Figure 1:
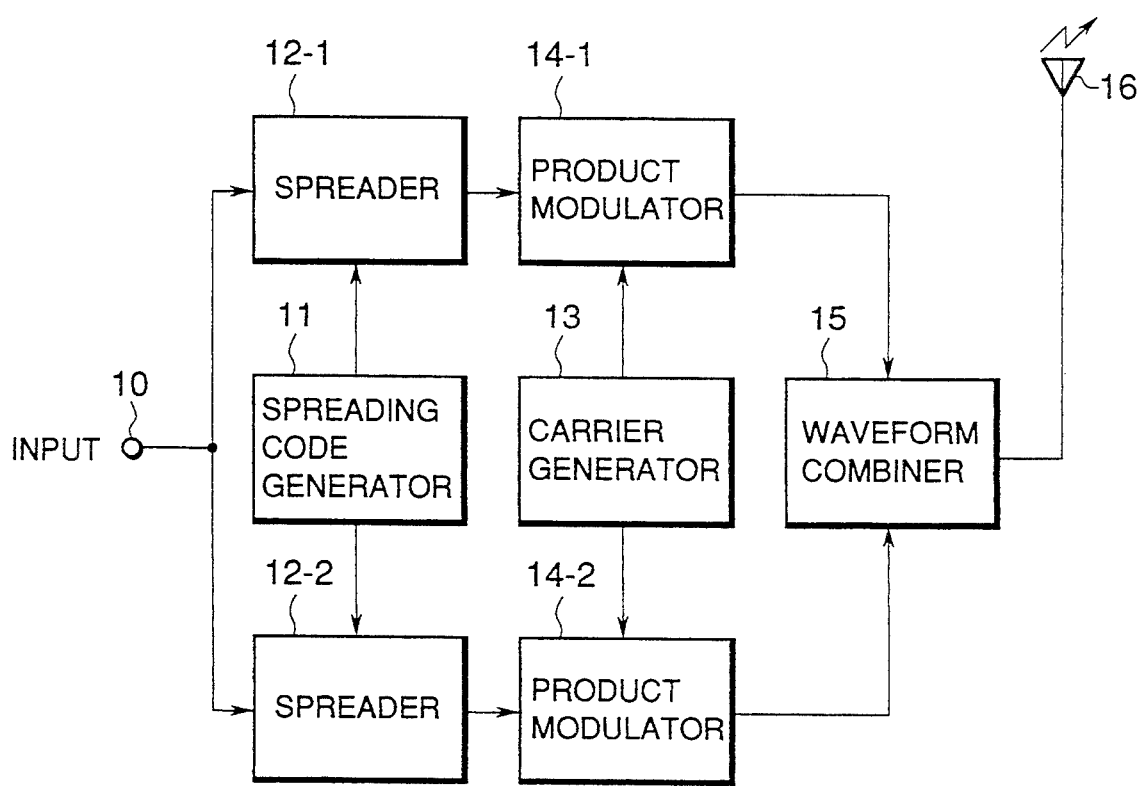
FIG. 1 is a block diagram of the invented transmitter.

Referring to FIG. 1, data symbols to be transmitted are input to the transmitter at an input terminal 10. The transmitter has a spreading-code generator 11 that generates an original spreading code with a rate of N chips per data symbol, where N is all even integer greater than two. The chips and symbols will both be considered hereinafter to take on values of plus and minus one. The spreading-code generator 11 may generate any of various well-known types of spreading codes, such as a pseudo-random noise (PN) code, Gold code, or Walsh-Hadamard code.

The original spreading code will be denoted $c_k(t)$, where t indicates time. Different transmitters employ different original spreading codes, indicated by different values of the subscript k. These different original spreading codes should be mutually orthogonal (e.g. mutually orthogonal Walsh-Hadamard codes), or at least approximately orthogonal (e.g. PN or Gold codes). The number of different codes available is determined by N, larger values of N providing more codes as noted earlier.

The spreading-code generator 11 divides the original spreading code into two parts, denoted $c_{k1}(t)$ and $c_{k2}(t)$. The dividing can be done in any convenient way: for example, $c_{k1}(t)$ may comprise the odd-numbered chips of $c_k(t)$, and $c_{k2}(t)$ the even-numbered chips; or in each data symbol interval, $c_{k1}(t)$ may comprise the first N/2 chips of $c_k(t)$, and $c_{k2}(t)$ the second N/2 chips. In any case, $c_{k1}(t)$ and $c_{k2}(t)$ both have a rate of N/2 chips per data symbol.

The spreading-code generator 11 supplies $c_{k1}(t)$ and $c_{k2}(t)$ to a pair of spreaders 12, supplying $c_{k1}(t)$ to spreader 12-1 and $c_{k2}(t)$ to spreader 12-2. Both spreaders 12 also receive the symbol data input at the input terminal 10. Both spreaders 12 thus receive identical input symbol data. The input data will be denoted $a_k(t)$, where k and t have the same meaning as above.

The spreaders 12 multiply the same input data $a_k(t)$ by their respective spreading codes to produce two spread signals or baseband transmit signals $d_{k1}(t)$ and $d_{k2}(t)$, as follows.

$$d_{k1}(t) = a_k(t) \cdot c_{k1}(t)$$

$$d_{k2}(t) = a_k(t) \cdot c_{k2}(t)$$

If $T_a$ is the symbol duration, then $a_k(t)$ remains constant over intervals of length $T_a$. If $T_c$ is the chip duration of spreading codes $c_{k1}(t)$ and $c_{k2}(t)$, then $c_{k1}(t)$ and $c_{k2}(t)$ remain constant over intervals of duration $T_c$. Since $c_{k1}(t)$ and $c_{k2}(t)$ have N/2 chips per symbol, $T_c = T_a/(N/2)$.

The transmitter also, has a carrier generator 13 that generates two mutually orthogonal carrier signals $\cos(2\pi\, f_c t)$ and $\sin(2\pi\, f_c t)$, $f_c$ being the carrier frequency. These carrier signals are supplied to a pair of product modulators 14, $\cos(2\pi\, f_c t)$ being supplied to product modulator 14-1 and $\sin(2\pi\, f_c t)$ to product modulator 14-2. In the product modulators 14, the carrier signals are modulated by multiplication with respective baseband transmit signals $d_{k1}(t)$ and $d_{k2}(t)$ to produce a pair of radio-frequency (RF) signals $s_{k1}(t)$ and $s_{k2}(t)$, as follows.

$$s_{k1}(t) = d_{k1}(t)\cdot\cos(2\pi\, f_c t) = a_k(t)\cdot c_{k1}(t)\cdot\cos(2\pi\, f_c t)$$

$$s_{k2}(t) = d_{k2}(t)\cdot\sin(2\pi\, f_c t) = a_k(t)\cdot c_{k2}(t)\cdot\sin(2\pi\, f_c t)$$

A waveform combiner 15 combines these two RF signals by adding them to obtain a single RF signal $s_k(t)$.

$$\begin{aligned} s_k(t) &= s_{k1}(t) + s_{k2}(t) \\ &= d_{k1}(t)\cdot\cos(2\pi f_c t) + d_{k2}(t)\cdot\sin(2\pi f_c t) \end{aligned}$$

This single RF signal $s_k(t)$ is sent with suitable amplification (not shown) to a transmitting antenna 16, from which it is transmitted.

Figure 2:
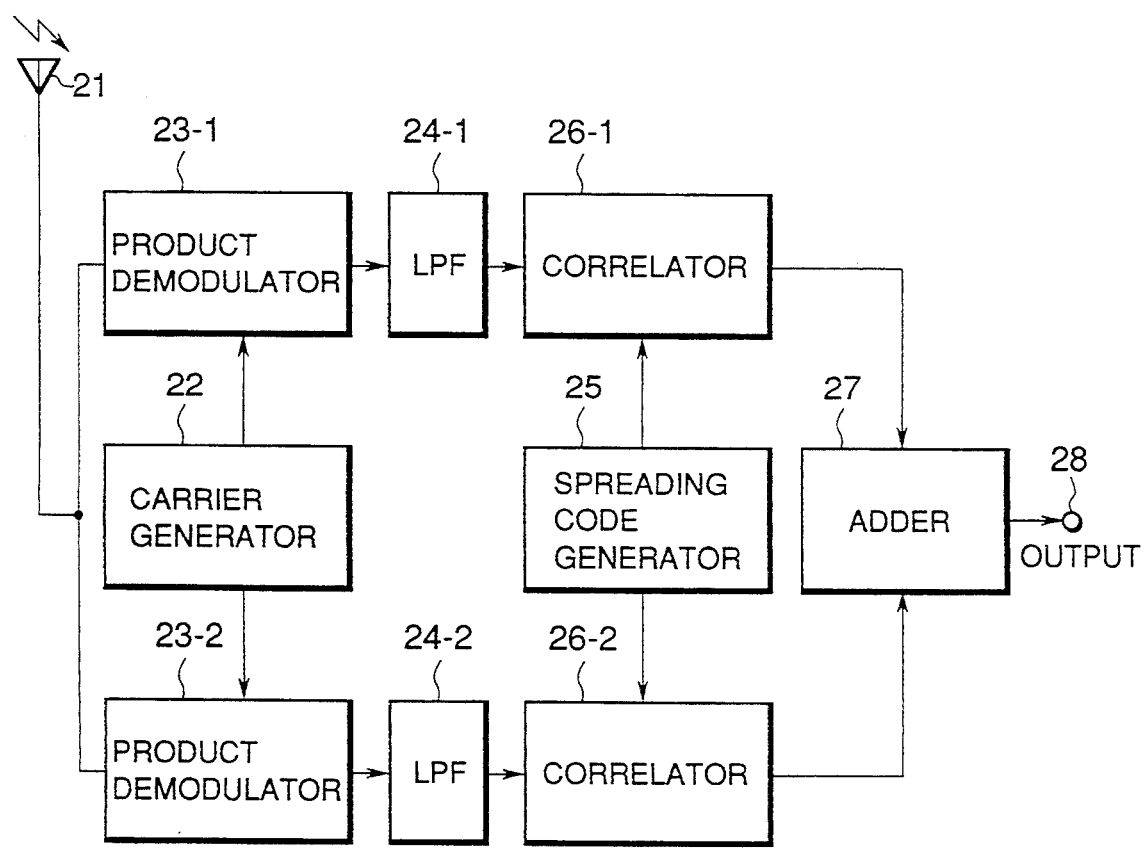
FIG. 2 is a block diagram of the invented receiver.

Referring to FIG. 2, the receiver has a receiving antenna 21 at which it receives the signals from various transmitters. To simplify the discussion it is useful to assume that the transmitters and receiver are all synchronized with each other. If M transmitters are transmitting simultaneously, the received signal R(t) can then be expressed as follows.

$$R(t) = \sum_{k=1}^{M} s_k(t)$$

The receiver has a carrier generator 22 that generates the same two carrier signals $\cos(2\pi\, f_c t)$ and $\sin(2\pi\, f_c t)$ as are generated in the transmitters, in synchronization with the carrier signals generated in the transmitters. These carrier signals are supplied to a pair of product demodulators 23, $\cos(2\pi\, f_c t)$ being supplied to product demodulator 23-1 and $\sin(2\pi\, f_c t)$ to product demodulator 23-2. The product demodulators 23 multiply tile received signal R(t) by these two carrier signals $\cos(2\pi\, f_c t)$ and $\sin(2\pi\, f_c t)$ to produce a pair of product signals $U_1(t)$ and $U_2(t)$, as follows.

$$U_1(t) = R(t)\cdot\cos(2\pi\, f_c t)$$

$$U_2(t) = R(t)\cdot\sin(2\pi\, f_c t)$$

The product signals $U_1(t)$ and $U_2(t)$ are then passed through a pair of low-pass filters (LPFs) 24 to extract a pair of baseband receive signals $E_1(t)$ and $E_2(t)$. LPF 24-1 filters $U_1(t)$ to produce $E_1(t)$; LPF 24-2 filters $U_2(t)$ to produce $E_2(t)$. If the low-pass filters have suitable cut-off frequencies, then $E_1(t)$ and $E_2(t)$ will be substantially equal to the sums of the baseband transmit signals transmitted by the various transmitters.

$$E_1(t) = \sum_{k=1}^{M} d_{k1}(t) = \sum_{k=1}^{M} a_k(t)\cdot c_{k1}(t)$$

$$E_2(t) = \sum_{k=1}^{M} d_{k2}(t) = \sum_{k=1}^{M} a_k(t)\cdot c_{k2}(t)$$

To receive the transmission from the k-th transmitter, a spreading-code generator 25 in the receiver generates the k-th transmitter's original spreading code $c_k(t)$, in synchronization with the spreading-code generator 11 in the k-th transmitter. (A description of the well-known methods of synchronizing the two spreading-code generators will be omitted.) Then the spreading-code generator 25 divides this original spreading code $c_k(t)$ into two spreading codes $c_{k1}(t)$ and $c_{k2}(t)$, in the same way that $c_k(t)$ was divided into $c_{k1}(t)$ and $c_{k2}(t)$ in the transmitter. These two spreading codes are supplied to a pair of correlators 26, $c_{k1}(t)$ being supplied Go correlator 26-1 and $c_{k2}(t)$ to correlator 26-2.

The correlators 26 despread the baseband receive signals $E_1(t)$ and $E_2(t)$ by correlating them with respective spreading codes $c_{k1}(t)$ and $c_{k2}(t)$, thereby obtaining two correlated signals. Bach correlated signal consists of one correlated value $b_{k1}$ or $b_{k2}$ for each data symbol interval. Restricting attention to one symbol, if time t is measured in units equal to the above-mentioned chip duration $T_c$, the correlation calculations can be expressed as follows.

$$b_{k1} = (1/N)\sum_{t=1}^{N/2} E_1(t)\cdot c_{k1}(t)$$

$$b_{k2} = (1/N)\sum_{t=1}^{N/2} E_2(t)\cdot c_{k2}(t)$$

Finally, an adder 27 takes the sum of $b_{k1}$ and $b_{k2}$ to obtain an output data signal $b_k$, and sends $b_k$ to an output terminal 28 as an estimate of the data symbol originally input to the k-th transmitter. Thus, $$\begin{aligned} b_k &= b_{k1} + b_{k2} \\ &= (1/N)\left[\sum_{t=1}^{N/2} E_1(t)\cdot c_{k1}(t) + \sum_{t=1}^{N/2} E_2(t)\cdot c_{k2}(t)\right] \end{aligned}$$

This $b_k$ is the same estimate as would have been obtained in a conventional CDMA system if the k-th transmitter had spread its symbol data at a rate of N chips per symbol, using spreading code $c_k(t)$, and had transmitted the resulting spread signal on a single carrier signal, and the receiver had correlated the received signal with $c_k(t)$.

If the symbol data were encoded with suitable redundancy, the output data signal $b_k$ can be provided to further circuitry (not shown) for detection and correction of errors.

Because of the orthogonality, or approximate orthogonality, of the original spreading codes $c_k(t)$ employed in different transmitters, the estimate $b_k$ will be equal, or substantially equal, to the transmitted symbol $a_k(t)$. The well-known computational details supporting this statement will be omitted; suffice it to point out that while products of the form $c_{k1}(t)\cdot c_{k1}(t)$ and $c_{k2}(t)\cdot c_{k2}(t)$ are always equal to unity, products of the form $c_{j1}(t)\cdot c_{k1}(t)$ and $c_{j2}(t) \cdot c_{k2}(t)$ (where $j \neq k$) will be plus one and minus one with equal frequency (or approximately equal frequency), averaging out to zero.

Since the output data signal $b_k$ is the same as would have been obtained by using the original spreading code $c_k(t)$, the invented CDMA system above can accommodate the same number of user channels as a conventional CDMA system operating at a rate of N chips per symbol. Since the signals actually transmitted have been spread by $c_{k1}(t)$ and $c_{k2}(t)$, however, and these spreading codes have only N/2 chips per symbol, the invented system requires only as much bandwidth as a conventional CDMA system operating at a rate of N/2 chips per symbol.

The bandwidth requirement is substantially proportional to the chip rate. For a given user channel capacity, the invented CDMA system accordingly requires only about half as much bandwidth as a conventional CDMA system. Conversely, for a given bandwidth, the invented system can accommodate more users than a conventional system.

A further advantage of the invention is improved efficiency of the spreading process, since the two spreaders 12-1 and 12-2 in the transmitter share the spreading task and operate in parallel. Similarly, the two correlators 26-1 and 26-2 in the receiver operate efficiently in parallel. The two product modulators 14-1 and 14-2, the two product demodulators 23-1 and 23-2, and the two low-pass filters 24-1 and 24-2 also operate in parallel.

The transmitter and receiver described above had spreading-code generators 11 and 25 that began by generating an original spreading code, which they divided into two parts to generate the two spreading codes $c_{k1}(t)$ and $c_{k2}(t)$. With certain types of spreading codes, such as pseudo-random noise codes, the code generators 11 and 25 could just as well generate $c_{k1}(t)$ and $c_{k2}(t)$ directly, without deriving them from a single original spreading code. In this case $c_{k1}(t)$ and $c_{k2}(t)$ should of course be different, but they need not be mutually orthogonal. Alternatively, $c_{k1}(t)$ and $c_{k2}(t)$ could be generated in the spreaders 12 and correlators 26.

It is not always necessary for all transmitters and receivers to be synchronized. The invention remains applicable in systems that operate without complete synchronization, e.g. systems in which the symbol boundaries at different transmitters are unsynchronized.

Those skilled in the art will recognized that further modifications can be made to the embodiment described above without departing from the scope of the invention as claimed below.

What is claimed is:

1. A method of transmitting and receiving symbol data in a code-division multiple-access spread-spectrum communication system, comprising the steps of:
   spreading symbol data by a first spreading code and spreading identical symbol data by a second spreading code to generate two baseband transmit signals;
   generating two mutually orthogonal carrier signals;
   modulating one of said two mutually orthogonal carrier signals by one of said two baseband transmit signals and modulating another of said two mutually orthogonal carrier signals by another of said two baseband transmit signals, thereby generating two radio-frequency signals;
   combining said two radio-frequency signals into a single radio-frequency signal;
   transmitting said single radio-frequency signal from a transmitting antenna to a receiving antenna;
   demodulating the single radio-frequency signal received at said receiving antenna to obtain two baseband receive signals;
   despreading said two baseband receive signals by correlating them with said first and second spreading codes to obtain two correlated signals; and
   summing said two correlated signals, thereby obtaining an output data signal.

2. The method of claim 1, wherein the step of spreading comprises:
   generating a third spreading code having a rate of N chips per symbol, where N is an even integer greater than two; and
   separating said third spreading code into two parts to obtain said first and second spreading codes, each of said first and second spreading codes having a rate of N/2 chips per symbol.

3. The method of claim 2, wherein the step of despreading likewise comprises generating said third spreading code and separating said third spreading code into said two parts.

4. The method of claim 2, wherein said third spreading code is a pseudo-random noise code.

5. The method of claim 2, wherein said third spreading code is a Gold code.

6. The method of claim 2, wherein said third spreading code is a Walsh-Hadamard code.

7. The method of claim 1, wherein the step of modulating comprises multiplying said carrier signals by respective baseband transmit signals.

8. The method of claim 1, wherein the step of combining comprises adding said two radio-frequency signals.

9. The method of claim 1, wherein the step of demodulating comprises:
   multiplying said single radio-frequency signal by said carrier signals to obtain two product signals; and
   low-pass-filtering said two product signals to obtain said two baseband receive signals.

10. The method of claim 1, wherein the step of despreading comprises:
    multiplying one of said two baseband receive signals by said first spreading code to obtain a product;
    multiplying the other of said two baseband receive signals by said second spreading code to obtain another product; and
    summing said products over respective one-symbol intervals.

11. A transmitter for a code-division multiple-access spread-spectrum communication system, comprising:
    a pair of spreaders for spreading symbol data by a first spreading code and for spreading identical symbol data by a second spreading code to generate two baseband transmit signals;
    a carrier generator for generating two mutually orthogonal carrier signals;
    a pair of product modulators, coupled to said carrier generator, to modulate said two mutually orthogonal carrier signals by respective baseband transmit signals, thereby generating two radio-frequency signals;
    a waveform combiner, coupled to said product modulators, to combine said two radio-frequency signals into a single radio-frequency signal; and a transmitting antenna, coupled to said waveform combiner, to transmit said single radio-frequency signal.

12. The transmitter of claim 11, also comprising a spreading code generator for generating a third spreading code, dividing said third spreading code into two parts to create said first and second spreading codes, and supplying said first and second spreading codes to respective spreaders in said pair of spreaders.

13. The transmitter of claim 12, wherein said third spreading code has a rate of N chips per symbol and each of said first and second spreading codes has a rate of N/2 chips per symbol, N being an even integer greater than two.

14. The transmitter of claim 12, wherein said third spreading code is a pseudo-random noise code.

15. The transmitter of claim 12, wherein said third spreading code is a Gold code.

16. The transmitter of claim 12, wherein said third spreading code is a Walsh-Hadamard code.

17. A receiver for a code-division multiple-access spread-spectrum communication system, comprising:
 a receiving antenna for receiving a radio-frequency signal;
 a carrier generator for generating two mutually orthogonal carrier signals;
 a product demodulator, coupled to said carrier generator, to demodulate said radio-frequency signal by multiplication with one of said two mutually orthogonal carrier signals, thereby generating a baseband receive signal;
 another product demodulator, coupled to said carrier generator, to demodulate said radio-frequency signal by multiplication with the other of said two mutually orthogonal carrier signals, thereby generating another baseband receive signal;
 a first correlator, coupled to one of said product demodulators, to correlate one of said baseband receive signals with a first spreading code, thereby producing a first correlated signal;
 a second correlator, coupled to the other of said product demodulators, to correlate the other of said baseband receive signals with a second spreading code, thereby producing a second correlated signal; and
 an adder, coupled to said first and second correlators, to add said first and second correlated signals, thereby generating an output data signal.

18. The receiver of claim 17, also comprising a spreading code generator for generating a third spreading code, dividing said third spreading code into two parts to create said first and second spreading codes, and supplying said first spreading code and said second spreading code respectively to said first correlator and to said second correlator.

19. The transmitter of claim 18, wherein said third spreading code has a rate of N chips per symbol and each of said first and second spreading codes has a rate of N/2 chips per symbol, N being an even integer greater than two.

20. The transmitter of claim 18, wherein said third spreading code is a pseudo-random noise code.

21. The transmitter of claim 18, wherein said third spreading code is a Gold code.

22. The transmitter of claim 18, wherein said third spreading code is a Walsh-Hadamard code.

23. The receiver of claim 18, also comprising a pair of low-pass filters for filtering respective baseband receive signals.

24. A transmitting method for use in a code-division multiple-access spread-spectrum communication system, comprising the steps of:
 generating first and second spread signals by spreading an input signal with a first spreading code to obtain the first spread signal and spreading the same input signal with a second spreading code to obtain the second spread signal;
 generating a first modulated signal from the first spread signal and a first carrier signal;
 generating a second modulated signal from the second spread signal and a second carrier signal, the second carrier signal being orthogonal to the first carrier signal; and
 combining the first modulated signal and the second modulated signal before transmission thereof.

25. The transmitting method of claim 24, further comprising the step of generating the first and second spreading codes from a third spreading code having a rate of N chips per symbol, where N is an integer greater than 2, by separating the third spreading code into parts to obtain the first and second spreading codes, the first and second spreading codes having rates that are smaller than N chips per symbol.

* * * * *